US009513591B2

(12) United States Patent
Black et al.

(10) Patent No.: US 9,513,591 B2
(45) Date of Patent: Dec. 6, 2016

(54) PHOTOCONDUCTOR OVERCOAT HAVING A RADICAL POLYMERIZABLE CHARGE TRANSPORT MOLECULE CONTAINING TWO ETHYL ACRYLATE FUNCTIONAL GROUPS AND URETHANE ACRYLATE RESINS CONTAINING SIX RADICAL POLYMERIZABLE FUNCTIONAL GROUPS

(71) Applicant: LEXMARK INTERNATIONAL, INC., Lexington, KY (US)

(72) Inventors: David Glenn Black, Broomfield, CO (US); Mark Thomas Bellino, Loveland, CO (US); James Alan Hartman, Broomfield, CO (US); Weimei Luo, Louisville, CO (US); Scott Daniel Reeves, Louisville, CO (US); Tanya Yvonne Thames, Commerce City, CO (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 14/960,643

(22) Filed: Dec. 7, 2015

(65) Prior Publication Data
US 2016/0085162 A1 Mar. 24, 2016

Related U.S. Application Data

(63) Continuation of application No. 14/105,436, filed on Dec. 13, 2013, now Pat. No. 9,360,822.

(51) Int. Cl.
G03G 5/147 (2006.01)
G03G 15/00 (2006.01)
C09D 5/24 (2006.01)
G03G 5/05 (2006.01)
G03G 5/06 (2006.01)
G03G 5/07 (2006.01)
G03G 5/04 (2006.01)

(52) U.S. Cl.
CPC ............ G03G 15/751 (2013.01); C09D 5/24 (2013.01); G03G 5/04 (2013.01); G03G 5/0575 (2013.01); G03G 5/0614 (2013.01); G03G 5/071 (2013.01); G03G 5/076 (2013.01); G03G 5/1473 (2013.01); G03G 5/14769 (2013.01); G03G 5/14791 (2013.01)

(58) Field of Classification Search
CPC .................................................. G03G 5/14713
See application file for complete search history.

(56) References Cited

U.S. PATENT DOCUMENTS 8,802,339 B2* 8/2014 Reeves ............. C08G 18/8116 399/159
2008/0292981 A1* 11/2008 Toda .................... G03G 5/0507 430/58.65

* cited by examiner

Primary Examiner — Hoa V Le

(57) ABSTRACT

An improved overcoat layer for an organic photoconductor drum of an electrophotographic image forming device is provided. The overcoat layer is prepared from a curable composition including a triphenylamine charge transport containing two ethyl acrylate functional groups and a urethane resin containing six radical polymerizable functional groups. The amount of the triphenylamine charge transport containing two ethyl acrylate functional groups in the curable composition is about 20 to about 80 percent by weight. The amount of the urethane resin containing six radical polymerizable functional groups in the curable composition is about 20 to about 80 percent by weight. This overcoat layer improves wear resistance of the organic photoconductor drum without negatively altering the electrophotographic properties, thus protecting the organic photoconductor drum from damage and ultimately providing a photoconductor with a longer useful life when compared to other organic photoconductors commercially available.

7 Claims, 3 Drawing Sheets

PHOTOCONDUCTOR OVERCOAT HAVING A RADICAL POLYMERIZABLE CHARGE TRANSPORT MOLECULE CONTAINING TWO ETHYL ACRYLATE FUNCTIONAL GROUPS AND URETHANE ACRYLATE RESINS CONTAINING SIX RADICAL POLYMERIZABLE FUNCTIONAL GROUPS

CROSS REFERENCES TO RELATED APPLICATIONS

This application is related to U.S. patent application Ser. No. 14/105,436, entitled "PHOTOCONDUCTOR OVERCOAT HAVING RADICAL POLYMERIZABLE CHARGE TRANSPORT MOLECULE CONTAINING TWO ETHYL ACRYLATE FUNCTIONAL GROUPS AND URETHANE ACRYLATE RESINS CONTAINING SIX RADICAL POLYMERIZABLE FUNCTIONAL GROUPS", filed on Dec. 13, 2013 and assigned to the assignee of this application.

BACKGROUND

1. Field of the Disclosure

The present disclosure relates generally to electrophotographic image forming devices, and more particularly to an overcoat layer for an organic photoconductor drum containing excellent abrasion resistance and electrical properties.

2. Description of the Related Art

Organic photoconductor drums have generally replaced inorganic photoconductor drums in electrophotographic image forming device including copiers, facsimiles and laser printers due to their performance and advantages. These advantages include improved optical properties such as having a wide range of light absorbing wavelengths, improved electrical properties such as having high sensitivity and stable chargeability, availability of materials, good manufacturability, low cost, and low toxicity.

While the performance and advantages offered by organic photoconductor drums are significant, inorganic photoconductor drums offer much higher durability. Inorganic photoconductor drums (e.g., amorphous silicon photoconductor drums) are ceramic-based, thus being extremely hard and abrasion resistant. The surface of organic photoconductor drums is typically comprised of a low molecular weight charge transport material, and an inert polymeric binder. Therefore, the failure mechanism for organic photoconductor drums typically arises from mechanical abrasion of the surface layer due to repeated use. Abrasion of photoconductor drum surface may arise from its interaction with print media (e.g. paper), paper dust, or other components of the electrophotographic image forming device.

The abrasion of photoconductor drum surface degrades its electrical properties, such as sensitivity and charging properties. Electrical degradation results in poor image quality, such as lower optical density, and background fouling. When a photoconductor drum is locally abraded, images often have black toner bands due to the inability to hold charge in the thinner regions. This black banding often marks the end of the life of the photoconductor drum.

Increasing the life of the photoconductor drum will allow the photoconductor drum to become a permanent part of the electrophotographic image forming device. In other words, the photoconductor drum will no longer be a replaceable unit nor be viewed as a consumable. Photoconductor drums with a life-of-the-printer will allow the printer to operate with lower cost-per-page, more stable image quality, and less waste.

To achieve a long life photoconductor drum, especially with organic photoconductor drum, a protective overcoat layer may be coated onto the surface of the photoconductor drum. An overcoat layer formed from a crosslinkable silicon material has been known to improve life of the photoconductor drums used for color printers. However, such overcoat layer does not have the robustness for edge wear of photoconductor drums used in mono printers. Robust overcoat layer that improves wear resistance and extends life of photoconductor drums for both mono and color printers, is desired.

While a robust overcoat layer improves the life of photoconductor drums, a suitable overcoat layer is required that does not significantly alter the electrophotographic properties of the photoconductor drum. If the overcoat layer is too electrically insulating, the photoconductor drum will not discharge and will result in a poor latent image. On the other hand, if the overcoat layer is too electrically conducting, then the electrostatic latent image will spread resulting in a blurred image. Thus, a protective overcoat layer that improves life of the photoconductor drum must also allow charge migration to the photoconductor surface for development of the latent image with toner.

SUMMARY

The present disclosure provides an overcoat layer for an organic photoconductor drum of an electrophotographic image forming device. The overcoat layer is prepared from a curable composition including a triphenylamine charge transport molecule containing two ethyl acrylate functional groups. The amount of the triphenylamine charge transport molecule containing two ethyl acrylate functional groups in the curable composition is about 20 to about 80 percent by weight. The curable overcoat composition also comprises a urethane resin containing six radical polymerizable functional groups. The amount of the urethane resin containing six radical polymerizable functional groups in the curable composition is about 20 to about 80 percent by weight.

This overcoat layer improves wear resistance of the organic photoconductor drum while still allowing development of the latent image with toner, thus protecting the organic photoconductor drum from damage and extending its service life.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

Figure 1:
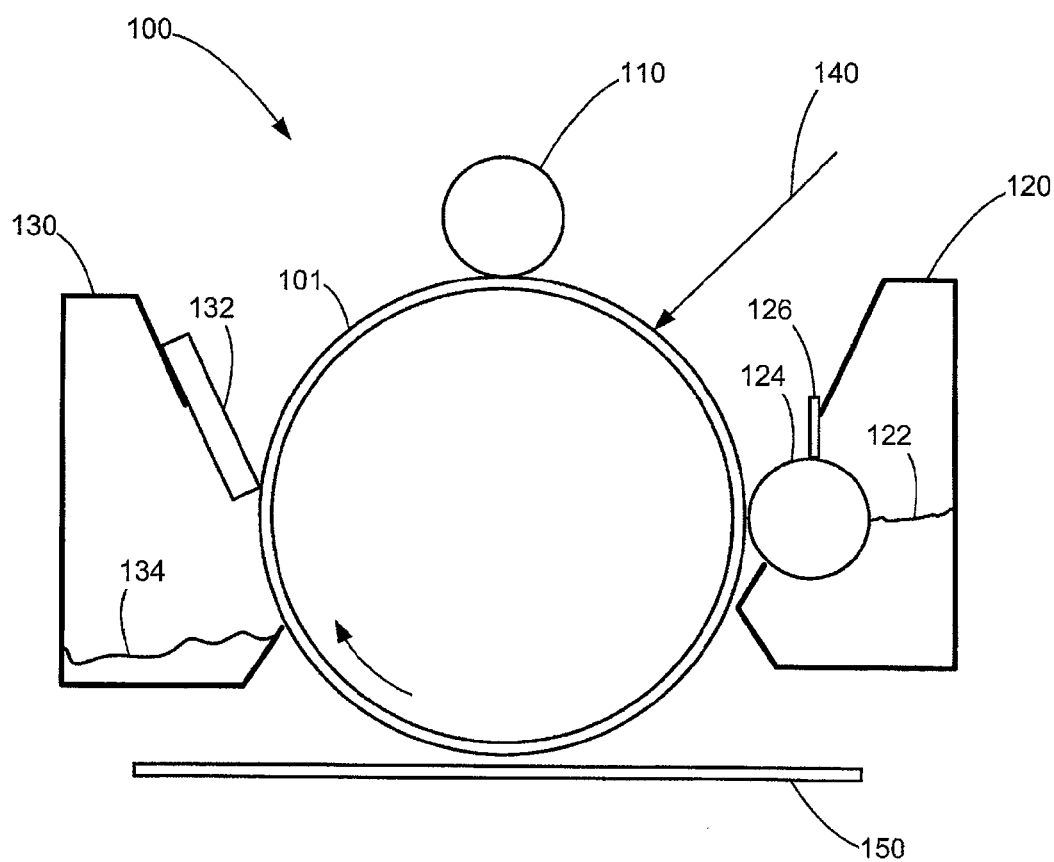
FIG. 1 is a schematic view of an electrophotographic image forming device.

It is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the terms "a" and "an" herein do not denote a limitation of quantity, but rather denote the presence of one of the referenced item.

FIG. 1 illustrates a schematic representation of an example electrophotographic image forming device 100. Image forming device 100 includes a photoconductor drum 101, a charge roll 110, a developer unit 120, and a cleaner unit 130. The electrophotographic printing process is well known in the art and, therefore, is described briefly herein. During a print operation, charge roll 110 charges the surface of photoconductor drum 101. The charged surface of photoconductor drum 101 is then selectively exposed to a laser light source 140 to form an electrostatic latent image on photoconductor drum 101 corresponding to the image being printed. Charged toner from developer unit 120 is picked up by the latent image on photoconductor drum 101 creating a toned image.

Developer unit 120 includes a toner sump 122 having toner particles stored therein and a developer roll 124 that supplies toner from toner sump 122 to photoconductor drum 101. Developer roll 124 is electrically charged and electrostatically attracts the toner particles from toner sump 122. A doctor blade 126 disposed along developer roll 124 provides a substantially uniform layer of toner on developer roll 124 for subsequent transfer to photoconductor drum 101. As developer roll 124 and photoconductor drum 101 rotate, toner particles are electrostatically transferred from developer roll 124 to the latent image on photoconductor drum 101 forming a toned image on the surface of photoconductor drum 101. In one embodiment, developer roll 124 and photoconductor drum 101 rotate in the same rotational direction such that their adjacent surfaces move in opposite directions to facilitate the transfer of toner from developer roll 124 to photoconductor drum 101. A toner adder roll (not shown) may also be provided to supply toner from toner sump 122 to developer roll 124. Further, one or more agitators (not shown) may be provided in toner sump 122 to distribute the toner therein and to break up any clumped toner.

The toned image is then transferred from photoconductor drum 101 to print media 150 (e.g., paper) either directly by photoconductor drum 101 or indirectly by an intermediate transfer member. A fusing unit (not shown) fuses the toner to print media 150. A cleaning blade 132 (or cleaning roll) of cleaner unit 130 removes any residual toner adhering to photoconductor drum 101 after the toner is transferred to print media 150. Waste toner from cleaning blade 132 is held in a waste toner sump 134 in cleaning unit 130. The cleaned surface of photoconductor drum 101 is then ready to be charged again and exposed to laser light source 140 to continue the printing cycle.

The components of image forming device 100 are replaceable as desired. For example, in one embodiment, developer unit 120 is housed in a replaceable unit with photoconductor drum 101, cleaner unit 130 and the main toner supply of image forming device 100. In another embodiment, developer unit 120 is provided with photoconductor drum 101 and cleaner unit 130 in a first replaceable unit while the main toner supply of image forming device 100 is housed in a second replaceable unit. In another embodiment, developer unit 120 is provided with the main toner supply of image forming device 100 in a first replaceable unit and photoconductor drum 101 and cleaner unit 130 are provided in a second replaceable unit. Further, any other combination of replaceable units may be used as desired. In some example embodiment, the photoconductor drum 101 may not be replaced and is a permanent component of the image forming device 100.

Figure 2:
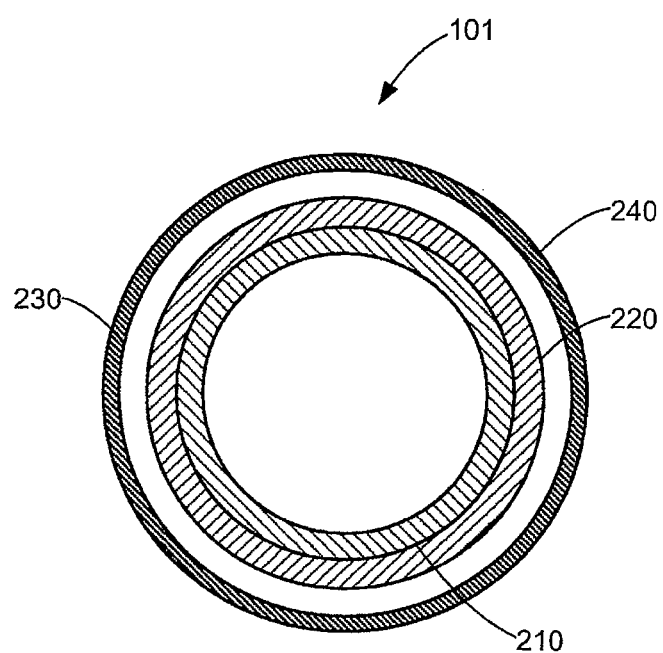
FIG. 2 is a cross-sectional view of a photoconductor drum of the electrophotographic image forming device.

FIG. 2 illustrates an example photoconductor drum 101 in more detail. In this example embodiment, the photoconductor drum 101 is an organic photoconductor drum and includes a support element 210, a charge generation layer 220 disposed over the support element 210, a charge transport layer 230 disposed over the charge generation layer 220, and a protective overcoat layer 240 formed as an outermost layer of the photoconductor drum 101. Additional layers may be included between the support element 210, the charge generation layer 220 and the charge transport layer 230, including adhesive and/or coating layers.

The support element 210 as illustrated in FIG. 2 is generally cylindrical. However the support element 210 may assume other shapes or may be formed into a belt. In one example embodiment, the support element 210 may be formed from a conductive material, such as aluminum, iron, copper, gold, silver, etc. as well as alloys thereof. The surfaces of the support element 210 may be treated, such as by anodizing and/or sealing. In some example embodiment, the support element 210 may be formed from a polymeric material and coated with a conductive coating.

The charge generation layer 220 is designed for the photogeneration of charge carriers. The charge generation layer 220 may include a binder and a charge generation compound. The charge generation compound may be understood as any compound that may generate a charge carrier in response to light. In one example embodiment, the charge generation compound may comprise a pigment being dispersed evenly in one or more types of binders.

The charge transport layer 230 is designed to transport the generated charges. The charge transport layer 230 may include a binder and a charge transport compound. The charge transport compound may be understood as any compound that may contribute to surface charge retention in the dark and to charge transport under light exposure. In one example embodiment, the charge transport compounds may include organic materials capable of accepting and transporting charges.

In an example embodiment, the charge generation layer 220 and the charge transport layer 230 are configured to combine in a single layer. In such configuration, the charge generation compound and charge transport compound are mixed in a single layer.

The overcoat layer 240 is designed to protect the photoconductor drum 101 from wear and abrasion without altering the electrophotographic properties, thus extending the service life of the photoconductor drum 101. The overcoat layer 240 has a thickness of about 0.1 µm to about 10 µm. Specifically, the overcoat layer 240 has a thickness of about 1 µm to about 6 µm, and more specifically a thickness of about 3 µm to about 5 µm. The thickness of the overcoat layer 240 is kept at a range that will not provide adverse effect to the electrophotographic properties of the photoconductor drum 101.

In an example embodiment, the overcoat layer 240 includes a three-dimensional crosslinked structure formed from a curable composition. The curable composition includes a triphenylamine charge transport molecule containing two ethyl acrylate functional groups. In one example embodiment, the curable composition includes about 20 to about 80 percent by weight of the triphenylamine charge transport molecule containing two ethyl acrylate functional groups, and about 20 to about 80 percent by weight of urethane resin containing six radical polymerizable functional groups. In more particular, the curable composition includes about 40 to about 60 percent by weight of the a triphenylamine charge transport molecule containing two ethyl acrylate functional groups and about 40 to about 60 percent by weight of the urethane resin containing six radical polymerizable functional groups. Loading the triphenylamine charge transport molecule containing two ethyl acrylate functional groups at less than 20% by weight in the curable composition, may not provide the overcoat layer 240 with sufficient conductivity to give sufficient electrical properties for excellent image quality. Additionally, loading the triphenylamine charge transport molecule containing two ethyl acrylate functional groups at greater than 80% by weight in the curable composition may not provide sufficient crosslink density to give the overcoat layer 240 with sufficient abrasion resistance.

The excellent properties exhibited by the overcoat of the present invention are dependent upon both the choice of urethane acrylate and crosslinkable charge transport molecule. Surprisingly, the inventors have discovered that overcoats containing a triphenylamine charge transport molecule containing two ethyl acrylate functional groups show significantly higher abrasion resistance when compared to the analogous triphenylamine charge transport molecule containing two propyl acrylate functional groups. The latter crosslinkable charge transport molecule was disclosed in U.S. Patent Application Ser. No. 13/731,594 entitled "PHOTOCONDUCTOR OVERCOATS COMPRISING RADICAL POLYMERIZABLE CHARGE TRANSPORT MOLECULES AND HEXA FUNCTIONAL URETHANE ACRYLATES".

While not wishing to be bound by theory, the inventors believe that the abrasion resistance imparted by a triphenylamine charge transport molecule containing two ethyl acrylate functional groups results from higher crosslink density versus triphenylamine charge transport molecules containing two propyl acrylate functional groups. The ethylacrylate groups of the present invention remove two non-crosslinkable methylene fragments from the crosslinked layer, thereby increasing the crosslink density when compared to the analogous propyl acrylate groups.

The triphenylamine charge transport molecule containing two ethyl acrylate functional groups of the present invention has the general structure shown below:

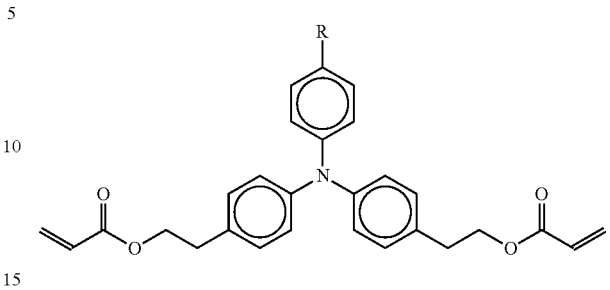

where R is H or an alkyl group.

Limiting the value of R to a hydrogen or alkyl group provides a charge transport molecule possessing the electrical properties sufficient to transport charge for a photoreceptor of the present invention. In principle, the alkyl group may be any branched or unbranched saturated hydrocarbon group having the general formula $C_nH_{2n+1}$, wherein n is, for example, a number from 1 to about 100 or more, such as methyl, ethyl, n-propyl, isopropyl, n-butyl, isobutyl, tort-butyl, octyl, decyl, tetradecyl, hexadecyl, eicosyl, tetracosyl, and the like. If R is an alkyl group, R contains 1 through about 12 carbon atoms, and more specifically, 1 through about 6 carbons. Both of the ethyl acrylate groups of the present invention are in the para position of the phenyl rings, relative to the nitrogen atom. The inventors have found that this positioning gives a charge transport molecule possessing the electrical properties sufficient to transport charge for a photoconductor of the present invention.

The overcoat formulation of the present invention also includes a urethane resin having six radical polymerizable functional groups. The six radical polymerizable functional groups of the urethane resin may be the same or different, and may be selected from the group consisting of acrylate group, methacrylate group, styrenic group, allylic group, vinylic group, glycidyl ether group, epoxy group, or combinations thereof. The urethane resin containing six radical polymerizable functional groups may be an aromatic urethane resin, an aliphatic resin, or combinations thereof.

In an example embodiment, the aromatic urethane resin containing six radical polymerizable functional groups is an aromatic urethane resin containing six acrylate groups of the following structure:

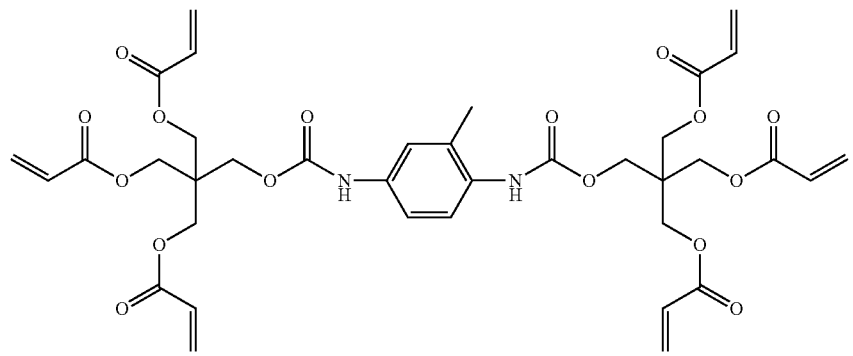 [SMILES: C=CC(=O)OCC(COC(=O)C=C)(COC(=O)C=C)COC(=O)Nc1ccc(NC(=O)OCC(COC(=O)C=C)(COC(=O)C=C)COC(=O)C=C)c(C)c1]

and is commercially available from Sartomer Corporation under the trade name CN975.

In an example embodiment, the aliphatic urethane resin containing six radical polymerizable functional groups is an aliphatic urethane resin containing six acrylate groups of the following structure:

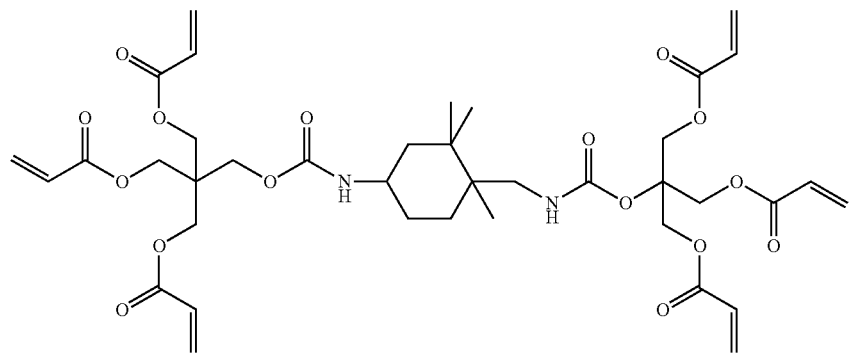 [SMILES: C=CC(=O)OCC(COC(=O)C=C)(COC(=O)C=C)COC(=O)NC1CCC(C)(CNC(=O)OC(COC(=O)C=C)(COC(=O)C=C)COC(=O)C=C)C(C)(C)C1]

and is commercially available from Cytec Industries under the trade name EBECRYL 8301.

Urethane acrylates containing six acrylate groups may also be synthesized using readily available starting materials, and well established synthetic methods. An Example of the synthesis of CN975 is shown below.

general sense, the choice of isocyanate and/or hydroxy acrylate plays a large role in determining the mechanical and thermal properties of the radically cured material. Curing of urethane acrylates, such as those described above, creates a 3-dimensionally crosslinked structure. Increasing the crosslink density of the radically cured material is one way to improve the mechanical and thermal properties of the materials. Urethane resins containing six acrylate groups are preferred since crosslink density increases with the number of radical polymerizable functional groups. High crosslink density is known to improve properties such as abrasion and chemical resistance. The crosslinked 3-dimensional network

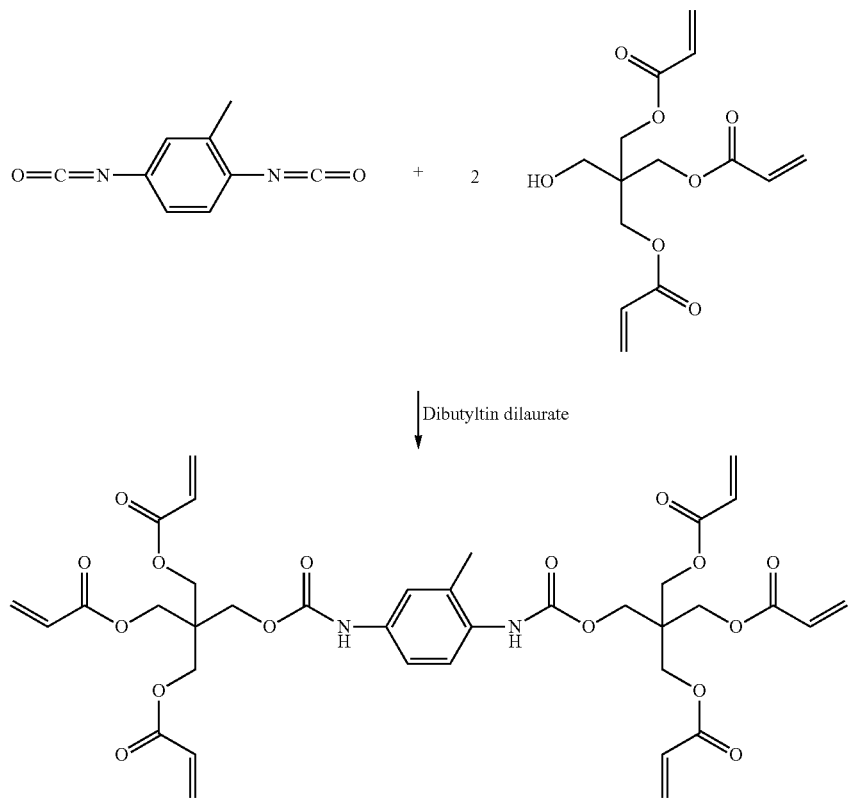

The urethane acrylate synthesis involves reaction of a diisocyanate with pentaerythritol triacrylate. In general, urethane acrylate chemistry involves reaction of an isocyanate with a hydroxy acrylate in the presence of a catalyst. In a should be homogeneous throughout the cured material, since this improves mechanical and thermal properties. Homogeneous crosslinking is also important for applications requiring a high degree of optical transparency.

The combination of a triphenylamine charge transport molecule containing two ethyl acrylate functional groups and a urethane resin containing six acrylate groups provides the overcoat layer 240 with excellent abrasion resistance. Urethane acrylate resins are most often used when a clear, thin, abrasion or impact resistant coating is required to protect an underlying structure. Consequently, urethane acrylates are most commonly deposited as thin films. Industrial applications include automotive and floor coatings with thicknesses ranging from tens to hundreds of microns. These applications, however, do not require charge migration to occur. In an electrophotographic printer, such as a laser printer, an electrostatic image is created by illuminating a portion of the photoconductor surface in an image-wise manner. The wavelength of light used for this illumination is most typically matched to the absorption max of a charge generation material, such as titanylphthalocyanine. Absorption of light results in creation of an electron-hole pair. Under the influence of a strong electrical field, the electron and hole (radical cation) dissociate and migrate in a field-directed manner. Photoconductors operating in a negative charging manner moves holes to the surface and electrons to ground. The holes discharge the photoconductor surface, thus leading to creation of the latent image. The urethane resins containing six acrylate groups of the present invention lack charge transporting properties, thus limiting the thickness of the overcoat layer 240. The addition of a triphenylamine charge transport molecule containing two ethyl acrylate functional groups in the curable composition provides the overcoat layer 240 with electrical properties that approach those of the underlying charge transport layer 230. The presence of a triphenylamine charge transport molecule containing two ethyl acrylate functional groups in the overcoat layer 240 allows the thickness of the overcoat layer to be increased without having significant adverse effects on the electrical properties of the photoconductor drum 101. Ultimately this overcoat formulation of the present invention leads to a photoconductor drum having an 'ultra long life', thereby allowing a consumer to successfully print at least 100,000 pages on their printer before they have to go purchase a replacement photoconductor drum.

The present invention describes a photoconductor overcoat layer containing the unique combination of a triphenylamine charge transport molecule containing two ethyl acrylate functional groups and a urethane resin containing six acrylate groups. This combination provides both the abrasion resistance of the urethane acrylate and the charge transporting properties of the radical polymerizable charge transport molecule. Additionally, the overcoat of the present invention has (1) excellent adhesion to the photoconductor surface, (2) optical transparency and (3) crack free. Overcoat delamination (poor adhesion) from the photoconductor surface has been noted as a problem in the prior art. Overcoat layers are typically coated in solvent systems designed to solubilize components of the overcoat formulation, while minimizing dissolution of the underlying photoconductor structure. Dissolution of components comprising the underlying photoconductor results in materials with no radical polymerizable functionality entering the overcoat layer. The result is dramatically lower crosslinking density and lower abrasion resistance since the properties of the overcoat layer are optimized by an uninterrupted 3-dimensional network. Ideally, the overcoat layer is distinct from the underlying photoconductor surface. However, the interface between the overcoat and the photoconductor surface often lacks the chemical interactions required for strong adhesion. The overcoat of the present invention have excellent adhesion to the photoconductor surface throughout the print life of the photoconductor. The overcoat must also be optically transparent. Illumination of the photoconductor in an image-wise manner requires that layers not involved in the charge generation process be transparent to the incident light. Additionally, optical transparency is an indicator of material and crosslink homogeneity within the overcoat structure. The overcoat of the present invention has a high degree of optical transparency throughout the print life of the photoconductor. The overcoat must also be crack free. UV or Ebeam cured films often exhibit cracks as a result of unrelieved internal stress. These cracks will manifest immediately in print, and will dramatically decrease the functional life of the overcoat. The overcoats of the present invention are crack free throughout the print life of the photoconductor.

The curable composition may further include a monomer or oligomer containing at most five radical polymerizable functional groups. The at most five radical polymerizable functional groups of the monomer or oligomer may be selected from the group consisting of acrylate group, methacrylate group, styrenic group, allylic group, vinylic group, glycidyl ether group, epoxy group, or combinations thereof.

Suitable examples of mono-functional monomers or oligomers include, but are not limited to, methyl acrylate, methyl methacrylate, ethyl acrylate, ethyl methacrylate, propyl acrylate, propyl methacrylate, isobornyl acrylate, isobornyl methacrylate, 2-phenoxyethyl acrylate, and lauryl methacrylate.

Suitable examples of di-functional monomers or oligomers include, but are not limited to, diacrylates and dimethacrylates, comprising 1,4-butanediol diacrylate, 1,4-butanediol dimethacrylate, ethylene glycol dimethacrylate, diethylene glycol diacrylate, diethylene glycol dimethacrylate, triethylene glycol diacrylate, triethylene glycol dimethacrylate, 1,3-butylene glycol diacrylate, 1,6-hexanediol diacrylate, 1,6-hexanediol dimethacrylate, 1,12-dodecanediol methacrylate, tripropylene glycol diacrylate, 1,3-butylene glycol dimethacrylate, 1,3-butylene glycol dimethacrylate, cyclohexane dimethanol diacrylate esters, or cyclohexane dimethanol dimethacrylate esters.

Suitable examples of tri-functional monomers or oligomers include, but are not limited to, trimethylolpropane triacrylate, trimethylolpropane trimethacrylate, hydroxypropyl acrylate-modified trimethylolpropane triacrylate, ethylene oxide-modified trimethylolpropane triacrylate, propylene oxide-modified trimethylolpropane triacrylate, and caprolactone-modified trimethylolpropane triacrylate. More specifically, the tri-functional monomer or oligomer includes propoxylated (3) trimethylolpropane triacrylate, ethoxylated (6) trimethylolpropane triacrylate, propoxylated (6) trimethylolpropane triacrylate, and ethoxylated (9) trimethylolpropane triacrylate.

Suitable examples of monomers or oligomers containing four radical polymerizable functional groups include, but are not limited to, pentaerythritol tetraacrylate, di-trimethylolpropane tetraacrylate, and ethoxylated pentaerythritol tetraacrylate.

Suitable examples of monomers or oligomers containing five radical polymerizable functional groups include, but are not limited to, pentaacrylate esters and dipentaerythritol pentaacrylate esters.

The curable composition may further include a non-radical polymerizable additive such as a surfactant at an amount equal to or less than about 10 percent by weight of the curable composition. More specifically, the amount of non-radical polymerizable additive is about 0.1 to about 5 percent by weight of the curable composition. The non-radical polymerizable additive may improve coating uniformity of the curable composition.

The curable composition is prepared by mixing the urethane resin and charge transport molecules in a solvent. The solvent may include organic solvent such as tetrahydrofuran (THF), toluene, alkanes such as hexane, butanone, cyclohexanone and alcohols. The solvent may include a mixture of two or more organic solvents to solubilize triphenylamine charge transport molecule containing two ethyl acrylate functional groups and the urethane resin containing six radical polymerizable functional groups.

The curable composition may be coated on the outermost surface of the photoconductor drum 101 through dipping or spraying. If the curable composition is applied through dip coating, an alcohol is used as the solvent to minimize dissolution of the components of the charge transport layer 230. The alcohol solvent includes isopropanol, methanol, ethanol, butanol, or combinations thereof.

The coated curable composition is then exposed a radiation source of sufficient energy to induce formation of free radicals to initiate the crosslinking. The exposed composition is then post-baked to anneal and relieve stresses in the coating. The radiation source of sufficient energy to induce formation of free radicals is either a UV source, or an ebeam source. If a UV source is used to generate free radicals, the curable composition may contain a photoinitiator.

Specific examples of photo initiators for use under UV cure conditions include acetone or ketal photo polymerization initiators such as diethoxyacetophenone, 2,2-dimethoxy-1,2-diphenylethane-1-one, 1-hydroxy-cyclohexyl-phenyl-ketone, 4-(2-hydroxyethoxy)phenyl-(2-hydroxy-2-propyl)ketone, 2-benzyl-2-dimethylamino-1-(4-molpholinophenyl)butanone-1,2-hydroxy-2-methyl-1-phenylpropane-1-one and 1-phenyl-1,2-propanedion-2-(o-ethoxycarbonyl)oxime; benzoinether photo polymerization initiators such as benzoin, benzoinmethylether, benzoinethylether, benzoinisobutylether and benzoinisopropylether; benzophenone photo polymerization initiators such as benzophenone, 4-hydroxybenzophenone, o-benzoylmethylbenzoate, 2-benzoylnaphthalene, 4-benzoylviphenyl, 4-benzoylphenylether, acrylated benzophenone and 1,4-benzoylbenzene; thioxanthone photo polymerization initiators such as 2-isopropylthioxanthone, 2-chlorothioxanthone, 2,4-dimethylthioxanthone, 2,4-diethylthioxanthone and 2,4-dichlorothioxanthone; phenylglyoxylate photoinitiators such as methylbenzoylformate and other photo polymerization initiators such as ethylanthraquinone, 2,4,6-trimethylbenzoyldiphenylphosphineoxide, 2,4,6-trimethylbenzoyldiphenylethoxyphosphineoxide, bis(2,4,6-trimethyl-benzoyl)phenylphosphineoxide, bis(2,4-dimethoxybenzoyl)-2,4,4-trimethylpentylphosphineoxide, methylphenylglyoxyester, 9,10-phenanthrene, acridine compounds, triazine compounds and imidazole compounds. Further, a material having a photo polymerizing effect can be used alone or in combination with the above-mentioned photo polymerization initiators. Specific examples of the materials include triethanolamine, methyldiethanol amine, 4-dimethylaminoethylbenzoate, 4-dimethylaminoisoamylbenzoate, ethyl(2-dimethylamino)benzoate and 4,4-dimethylaminobenzophenone. These polymerization initiators can be used alone or in combination. The loading of photoinitiator is between about 0.5 to about 20 parts by weight and more specifically from about 2 to about 10 parts by weight per 100 parts by weight of the curable composition.

Curing the composition by ebeam does not require the presence of a photoinitiator and thus may result in greater crosslink density. In an example embodiment, the radiation source of sufficient energy to induce formation of free radicals is ebeam.

Preparation of Example Photoconductor Drum

A photoconductor drum was formed using an aluminum substrate, a charge generation layer coated onto the aluminum substrate, and a charge transport layer coated on top of the charge generation layer.

The charge generation layer was prepared from a dispersion including type IV titanyl phthalocyanine, polyvinylbutyral, poly(methyl-phenyl)siloxane and polyhydroxystyrene at a weight ratio of 45:27.5:24.75:2.75 in a mixture of 2-butanone and cyclohexanone solvents. The polyvinylbutyral is available under the trade name BX-1 by Sekisui Chemical Co., Ltd. The charge generation dispersion was coated onto the aluminum substrate through dip coating and dried at 100° C. for 15 minutes to form the charge generation layer having a thickness of less than 1 μm, specifically a thickness of about 0.2 to about 0.3 μm.

The charge transport layer was prepared from a formulation including terphenyl diamine derivatives and polycarbonate at a weight ratio of 50:50 in a mixed solvent of THF and 1,4-dioxane. The charge transport formulation was coated on top of the charge generation layer and cured at 120° C. for 1 hour to form the charge transport layer having a thickness of about 17 μm to about 19 μm as measured by an eddy current tester.

EXAMPLE 1

The inventive overcoat layer including two ethyl acrylate functional groups was prepared from a formulation including 4,4'-di(acryly1oxyethyl)-4"-methyl-triphenylamine (20 g), EBECRYL 8301 (20 g) and ethanol (80 g). The formulation was coated through dip coating on the outer surface of the Example Photoconductor Drum described hereinabove.

The inventive coated layer was then exposed to an ebeam source at an accelerating voltage of 90 kV, a current of 3 mA, and an exposure time of 1.2 seconds. The ebeam cured photoreceptor was then thermally cured at 120° C. for 60 minutes. The cured layer forms the overcoat layer having a thickness of about 3.8 μm as measured by an eddy current tester.

COMPARATIVE EXAMPLE 1

An overcoat layer was prepared from a formulation including 4,4'-di(acrylyloxypropyl)triphenylamine (20 g), EBECRYL 8301 (20 g) and ethanol (80 g). The formulation was coated through dip coating on the outer surface of the Example Photoconductor Drum described above. The coated layer was then exposed to an ebeam source at an accelerating voltage of 90 kV, a current of 3 mA, and an exposure time of 1.2 seconds. The ebeam cured photoreceptor was then thermally cured at 120° C. for 60 minutes. The cured layer forms the overcoat layer having a thickness of about 3.9 μm as measured by an eddy current tester.

Figure 3:
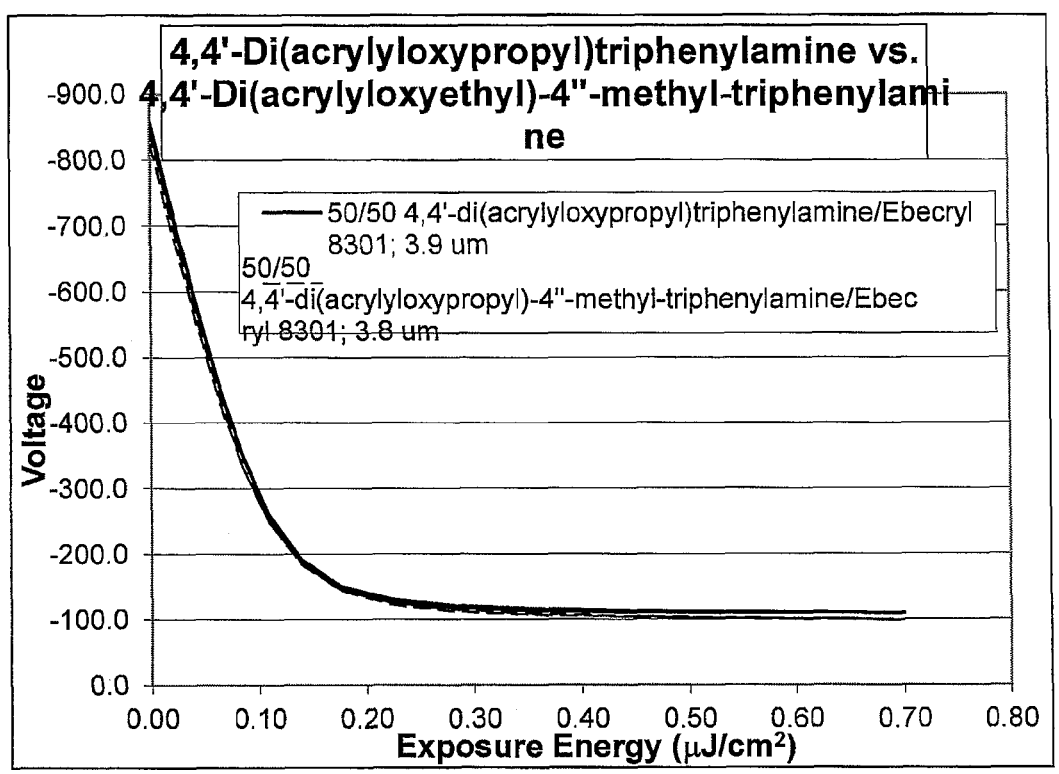
FIG. 3 is a graph of the voltage versus 780 nm. exposure energy for two overcoated photoconductors.

The photoconductor drums prepared in Example 1 and Comparative Example 1 were evaluated on an in-house electrostatic tester. The test results are shown in FIG. 3. The graph describes the photoconductor surface voltage as a function of 780 nm. laser exposure energy. The graph in FIG. 3 shows that the electrical properties derived from the inventive overcoat having 4,4'-di(acrylyloxyethyl)-4"-methyl-triphenylamine are nearly identical to the prior art overcoat having 4,4'-di(acrylyloxypropyl)triphenylamine).

This shows that the photoconductor drum overcoated with 2 ethyl acrylate functional groups maintain good electrical properties. These results show that the improved abrasion resistance imparted by the crosslinkable charge transport molecule of the present invention, and described in Table 1, do not come at the expense of a degradation in electrical properties.

Photoconductor drums from Example 1 and Comparative Example 1 were installed in an electrophotographic image forming device. The electrophotographic image forming device was then operated at 50 ppm in a four-page and pause run mode. Eddy current measurements were recorded every 20 k prints. The test was stopped when the average thickness loss exceeded the initial overcoat thickness. The initial thickness of the overcoat, print count, and the initial and end of test image print quality are summarized in Table 1.

TABLE 1

| Photoconductor Drum | Overcoat Thickness (μm) | Print Count (k Prints) | Image Quality (Beginning of Test) | Image Quality (End of Test) |
| --- | --- | --- | --- | --- |
| Example 1 | 4.4 | 140 | Excellent | Excellent |
| Comparative Example 1 | 4.5 | 100 | Excellent | Excellent |

As illustrated in Table 1, the photoconductor drum having the inventive overcoat containing 4,4'-di(acrylyloxyethyl)-4"-methyl-triphenylamine (Example 1) was run for an additional 40 k prints when compared to an identically prepared drum having an overcoat containing 4,4'-di(acrylyloxypropyl)triphenylamine (Comparative Example 1). This result is very favorable when trying to produce photoconductor drum with an ultra long life. Moreover, in addition to having a longer life, the photoconductor drum having the inventive overcoat maintained excellent print quality, darkness and image resolution and showed much less electrical fatigue when compared to a non-overcoated drum. The inventors believe that lower electrical fatigue results from the high abrasion resistance, and thus less thickness loss, imparted by the drums overcoated with the inventive formulation.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

What is claimed is:

1. A method of preparing a photoconductor comprising:
providing an electrically conductive substrate;
preparing a charge generation layer dispersion;
coating the charge generation layer dispersion onto the electrically conductive substrate to form a charge generation layer;
preparing a charge transport layer dispersion;
coating the charge transport layer dispersion over the charge generation layer to form a charge transport layer;
preparing a protective overcoat layer formulation, the protective overcoat layer being formed from a curable composition including:
about 20 to about 80 percent by weight of a triphenylamine charge transport molecule containing two ethyl acrylate functional groups as shown below:

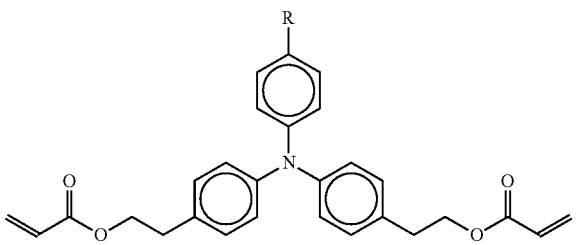

wherein R is selected from the group consisting of H and an alkyl group; and
about 20 to about 80 percent by weight of a urethane acrylate resin containing six radical polymerizable functional groups, an organic solvent and a photoinitiator,
coating the protective overcoat layer formulation over the charge transport layer; and
curing the protective overcoat layer formulation to form a photoconductor having a protective overcoat layer over the charge transport layer and the charge generation layers.

2. The method of claim 1, wherein the curable composition includes:
about 40 to about 60 percent by weight of a triphenylamine charge transport molecule containing two ethyl acrylate functional groups; and
about 40 to about 60 percent by weight of a urethane acrylate resin containing six radical polymerizable functional groups.

3. The method of claim 1, wherein R is a hydrogen atom.

4. The method of claim 1, wherein R is an alkyl group containing 1 to about 6 carbon atoms.

5. The method of claim 1, wherein the urethane resin of the urethane resin containing six radical polymerizable functional groups is an aliphatic urethane resin.

6. The method of claim 1, further comprising the step of adding a non-radical polymerizable additive to the curable composition.

7. The method of claim 1, wherein the protective overcoat layer has a thickness of about 0.1 μm to about 10 μm upon curing.

* * * * *